United States Patent
Xia et al.

(10) Patent No.: US 9,326,268 B2
(45) Date of Patent: Apr. 26, 2016

(54) PAGING BLOCK RATE CONTROL IN DUAL-SIM-DUAL-STANDBY (DSDS) HANDSETS

(71) Applicant: QUALCOMM Incorporated, San Diego, CA (US)

(72) Inventors: Ping Xia, San Diego, CA (US); Reza Shahidi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 498 days.

(21) Appl. No.: 13/831,744

(22) Filed: Mar. 15, 2013

(65) Prior Publication Data

US 2014/0274168 A1  Sep. 18, 2014

(51) Int. Cl.
  *H04W 68/02* (2009.01)
  *H04W 68/00* (2009.01)
  *H04W 76/04* (2009.01)

(52) U.S. Cl.
  CPC .......... *H04W 68/005* (2013.01); *H04W 76/048* (2013.01)

(58) Field of Classification Search
  CPC .................................................... H04W 48/10
  See application file for complete search history.

(56) References Cited

U.S. PATENT DOCUMENTS

| | | | |
|---|---|---|---|
| 2007/0099619 A1* | 5/2007 | Parekh et al. | 455/439 |
| 2009/0215473 A1* | 8/2009 | Hsu | 455/458 |
| 2011/0217969 A1* | 9/2011 | Spartz et al. | 455/422.1 |
| 2012/0231802 A1 | 9/2012 | Ngai | |
| 2013/0035120 A1 | 2/2013 | Dhanda et al. | |

FOREIGN PATENT DOCUMENTS

| | | |
|---|---|---|
| GB | 2381418 A | 4/2003 |
| WO | 2011092254 A1 | 8/2011 |
| WO | 2012035144 A1 | 3/2012 |
| WO | 2012079962 A1 | 6/2012 |
| WO | 2012106664 | 8/2012 |

OTHER PUBLICATIONS probabilityformula.org, Probability Formula, 2011.*
International Search Report and Written Opinion—PCT/US2014/028740—ISA/EPO—Dec. 4, 2014.

* cited by examiner

*Primary Examiner* — Olumide T Ajibade Akonai
*Assistant Examiner* — Randy Peaches
(74) *Attorney, Agent, or Firm* — Larry J. Moskowitz

(57) ABSTRACT

The various embodiments include methods for managing how a DSDS mobile communication device that is accessing an arbitrary combination of any two mobile telephony networks processes paging collisions. The embodiment methods promote the control of the paging block rates for two distinct subscriptions, in which a subscription's paging block rate is the long-term percentage of its blocked paging messages over its total number of received paging messages. In the various embodiments, a mobile communication device may use a paging blocking bias to achieve a particular paging blocking rate. The paging blocking bias may be set or adjusted through various means to cause a first subscription to have a paging blocking rate that is less than, equal to, or greater than a paging blocking rate for a second subscription.

61 Claims, 7 Drawing Sheets

PAGING BLOCK RATE CONTROL IN DUAL-SIM-DUAL-STANDBY (DSDS) HANDSETS

BACKGROUND

Some new designs of mobile communication devices—such as smart phones, tablet computers, and laptop computers—contain two Subscriber Identity Module (SIM) cards that provide users with access to two separate mobile telephony networks while using only one radio frequency (RF) transceiver. Examples of mobile telephony networks include GSM, TDSCDMA, CMA2000, and WCDMA. Example multi-SIM mobile communication devices include mobile phones, laptop computers, smart phones, and other mobile communication devices that are enable to connect to multiple mobile telephony networks. A mobile communication device that includes two SIM cards and connects to two separate mobile telephony networks using only one RF transceiver is termed a "dual-SIM-dual-standby" (DSDS) device.

In a dual-SIM-dual-standby communication device (i.e., a DSDS communication device), the RF frontend is time shared between two subscriptions, each associated with a different mobile telephony network. Only one subscription may use the RF front end to communicate with its mobile network at a time. However, even when the subscriptions are in "standby" mode, meaning they are not currently receiving a network paging message, they still need to perform discontinuous reception (DRX) of network paging messages at regular intervals (i.e., a discontinuous reception period) in order to remain connected to the network. Therefore, it is possible that at a certain times, the two subscriptions may need to use the RF transceiver to communicate with their respective mobile network at the same time. For example, two subscriptions may try to access the RF frontend to receive their paging messages simultaneously, or one subscription may be using the RF frontend when the other subscription receives a network paging message.

The overlapping page reception that occurs when the DSDS mobile communication device receives network paging messages for both subscriptions at the same time is referred to herein as a "paging collision." When a paging collision occurs, one subscription must be assigned the RF transceiver to the exclusion of the other subscription. In other words, one subscription may be blocked from communicating with its respective network in favor of the other subscription. Currently, the paging DRX cycle length (i.e., the length of time from the beginning of one network paging session to the next) for each subscription is determined entirely by the network and occurs in regular, predictable intervals. A DSDS communication device cannot manipulate or reschedule the paging DRX cycle for either subscription and, therefore, cannot avoid paging collisions that occur between two subscriptions.

SUMMARY

The various embodiments include methods for managing how a dual-SIM-dual-standby (DSDS) communication device that is accessing an arbitrary combination of any two mobile telephony networks processes paging collisions. The embodiment methods promote the control of the paging block rates for two distinct subscriptions, in which a subscription's paging block rate is the long-term percentage of its blocked paging messages over its total number of received paging messages. In the various embodiments, a mobile communication device may use a paging blocking bias to achieve a particular paging blocking rate. The paging blocking bias may be set or adjusted to cause a first subscription to have a paging blocking rate that is less than, equal to, or greater than a paging blocking rate for the second subscription.

In an embodiment, when a paging collision occurs, a DSDS mobile communication device may use a biased coin toss algorithm, which does not use a paging blocking bias, to select one of the two subscriptions to complete its communications with its mobile network. By using this biased coin toss algorithm, a mobile communication device may cause a first subscription and a second subscription to have approximately equal paging access or blocking rates when averaged over time. In an embodiment, a DSDS mobile communication device may initialize a biased coin used in the biased coin toss algorithm when the mobile communication device attaches to two different mobile networks. In a further embodiment, a DSDS mobile communication device may reinitialize a biased coin used in the biased coin toss algorithm when appropriate.

In another aspect, when a paging collision occurs, a DSDS mobile communication device may use a biased coin toss algorithm, which incorporates a paging blocking bias, to select which subscription may complete its communications with its mobile network. By using this biased coin toss algorithm that uses a paging blocking bias, a mobile communication device may cause a first subscription and a second subscription to have equal or unequal paging blocking rates over time. In a further embodiment, the DSDS mobile communication device may initialize a biased coin used in the biased coin toss algorithm when the mobile communication device attaches to two different mobile networks and may reinitialize the biased coin when appropriate.

In another embodiment, when a paging collision occurs, a DSDS mobile communication device may implement a Markov chain algorithm, which utilizes a paging blocking bias, to select which subscription may complete its communications with its mobile network. By using a Markov chain algorithm that uses a paging blocking bias, a DSDS mobile communication device may cause a first subscription and a second subscription to have equal or unequal paging blocking rates over time while also factoring in the results of previous collisions. In another embodiment, the DSDS mobile communication device may initialize a Markov chain used in the Markov chain algorithm when the mobile communication device attaches to two different mobile networks. In a further embodiment, the DSDS mobile communication device may reinitialize the Markov chain when appropriate.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
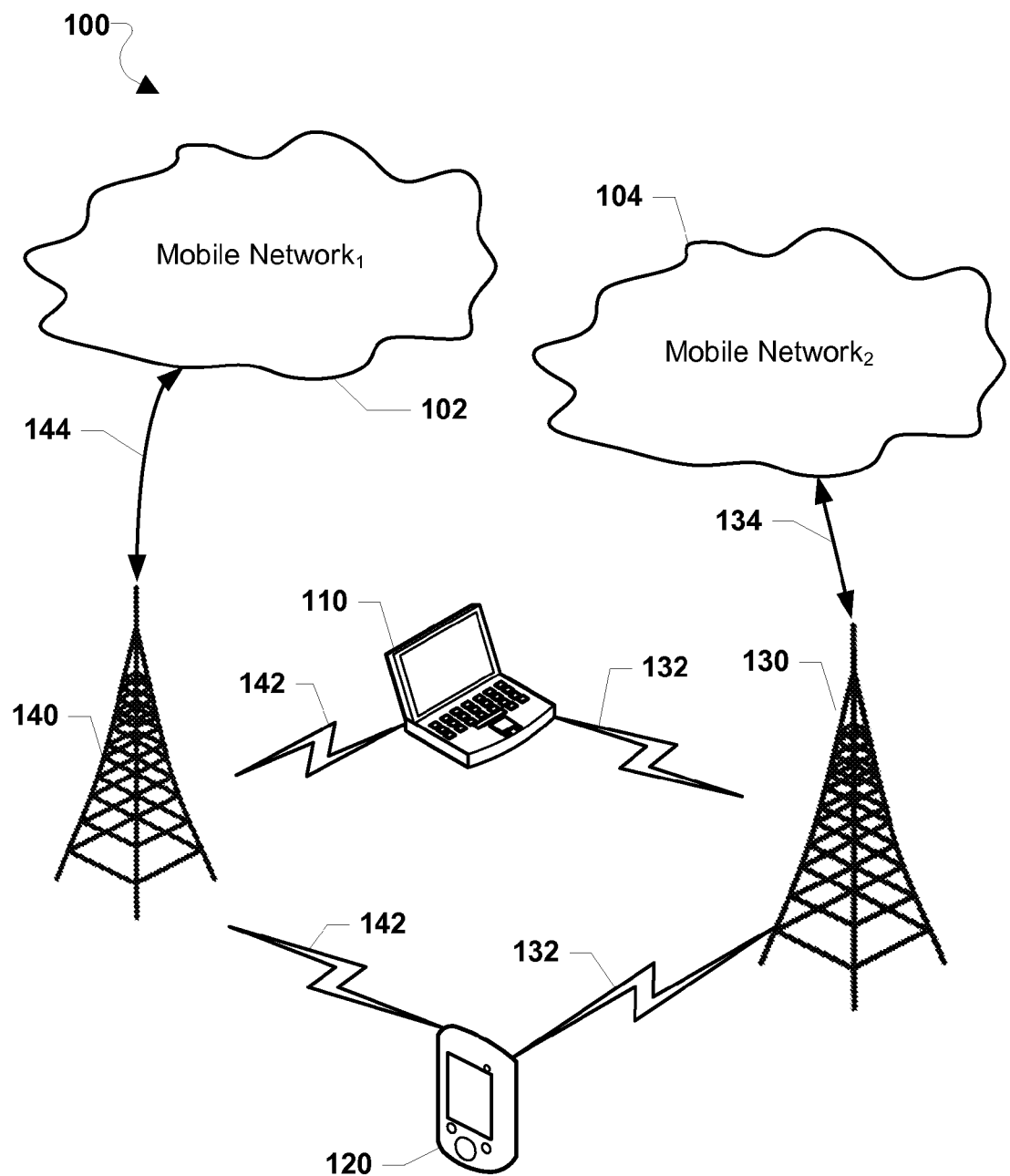
FIG. 1 is a communication system block diagram of a mobile telephony network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "mobile communication device" is used interchangeably herein to refer to any one or all of cellular telephones, smart phones, personal or mobile multimedia players, personal data assistants, laptop computers, personal computers, tablet computers, smart books, palm-top computers, wireless electronic mail receivers, multimedia Internet enabled cellular telephones, wireless gaming controllers, and similar personal electronic devices which include a programmable processor and memory and circuitry for connecting to at least two mobile communication networks. The various aspects may be useful in mobile communication devices, such as smart phones, and so such devices are referred to in the descriptions of the various embodiments. However, the embodiments may be useful in any electronic devices that may individually maintain a plurality of subscriptions to a plurality of mobile networks through a radio transceiver.

Modern mobile communication devices (e.g., smartphones) may now each include a plurality of SIM cards that enable a user to connect to different mobile networks while using the same mobile communication device. Each SIM card serves to identify and authenticate a subscriber using a particular mobile communication device, and each SIM card is associated with only one subscription. For example, a SIM card may be associated with a subscription to one of GSM, TDSCDMA, CMA2000, and WCDMA. With a DSDS mobile communication device, a user may maintain two subscriptions because the mobile communication device has two SIM cards. These subscriptions time share the radio frequency (RF) transceiver because both subscriptions cannot use the RF frontend simultaneously to connect to each subscription's respective mobile network.

Each subscription may periodically receive a page for a specific period of time from its respective mobile network. This transmission period is termed a "paging session." When a network message is sent to a subscription, that subscription may attempt to gain access to the RF transceiver for the duration of the paging session. When a paging session concludes, a subscription may release the RF transceiver from use and enter a low-power state until the next paging session begins. Network pages are sent in regular intervals by the mobile network, and the period of time from the beginning of one paging session to the next is termed a "DRX cycle." Additionally, the mobile network may change the length of time for a DRX cycle.

When a device has two subscriptions (e.g., a DSDS communication device), the subscriptions' paging sessions occasionally overlap, causing a "paging collision." Because only one subscription may have access to the RF transceiver at a time, when a paging collision occurs, the mobile communication device must decide which subscription may access the RF transceiver to complete its paging session and which subscription is blocked. Over time, a mobile communication device may tabulate each subscription's paging blocking rate, which is the ratio of the total number of times a device is blocked to the total number of paging messages sent by a mobile network to that subscription.

One of the challenges associated with processing collisions on a DSDS communication device is that the mobile communication device is unable to reschedule each subscription's paging session to avoid paging collisions. Without an effective method of handling paging collisions, the paging blocking rate for subscriptions may be unintentionally disproportionate or otherwise undesirable. For example, a first subscription may unintentionally have a worse paging block rate than a second subscription even though each subscription prevails in an equal number of paging collisions.

In overview, the various embodiments provide methods for controlling the paging blocking rate of two subscriptions on a DSDS communication device. The various embodiments enable a mobile communication device to create a priority between subscriptions by setting the paging blocking bias, thereby contributing to an overall improved user experience.

The various embodiments may be implemented within a variety of communication systems 100, such as at least two mobile telephony networks, an example of which is illustrated in FIG. 1. A first mobile network 102 and a second mobile network 104 are typical mobile networks that include a plurality of cellular base stations 130 and 140. A first mobile communication device 110 may be in communication with the first mobile network through a cellular connection 142 to a first base station 140. The first mobile communication device 110 may also be in communication with the second mobile network through a cellular connection 132 to a second base station 130. A second mobile communication device 120 may similarly communicate with the first mobile network 102 through a cellular connection 142 to a first base station 140. The second mobile communication device 120 may communicate with the second mobile network 104 through a cellular connection 132 to the second base station 130. Cellular connections 132 and 142 may made through two-way wireless communication links, such as 4G, 3G, CDMA, TDMA, and other mobile telephony communication technologies.

Figure 2:
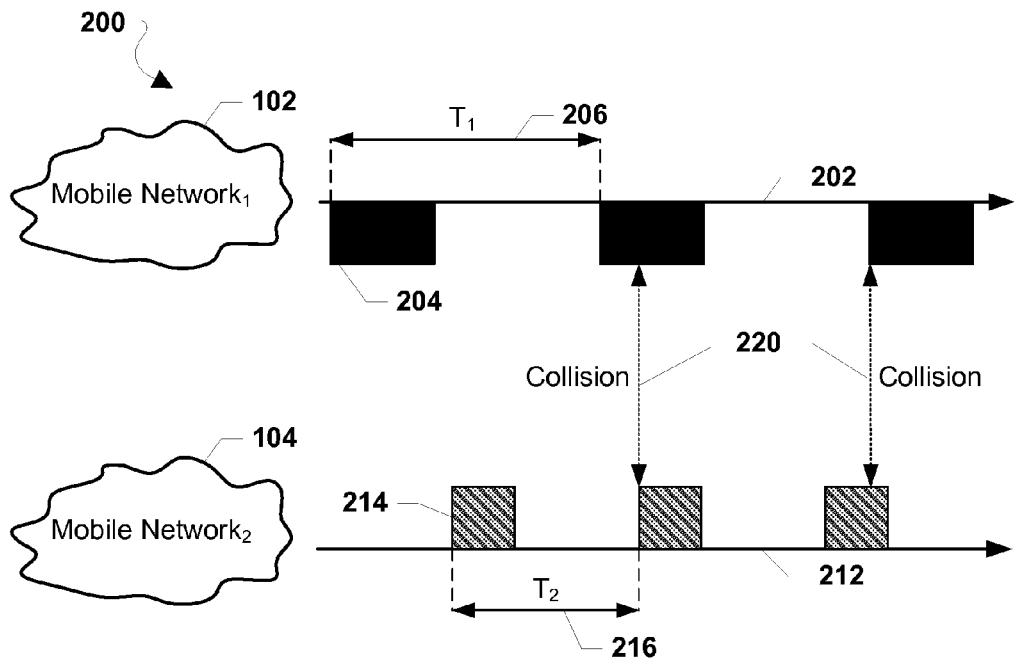
FIG. 2 is a time-line diagram of discontinuous reception of paging messages from two mobile networks according to an embodiment.

FIG. 2 illustrates a timeline diagram 200 that demonstrates an example of paging collisions between two subscriptions. In this example, a first subscription 202 to a first mobile network 102 may have a DRX cycle length 206 equal to $T_1$, wherein $T_1$ is a positive, real number. In other words, $T_1$ is a cycle length of a discontinuous reception period for the first subscription. The first subscription 202 may have a paging session duration 204 that is less than its DRX cycle length 206. A second subscription 212 to a second mobile network 104 may have a DRX cycle length 216 equal to $T_2$, wherein $T_2$ is a positive, real number. In other words, $T_2$ is a cycle length of a discontinuous reception period for the second subscription. The second subscription 212 may also have a paging session duration 214 that is less than its DRX cycle length 216. Because of the different DRX cycle lengths between the first subscription 202 and the second subscription 212, there may be collisions 220 that occur when, for example, the second subscription 212 receives a paging message 214 during the first subscription 202's paging session 204.

Figure 3:
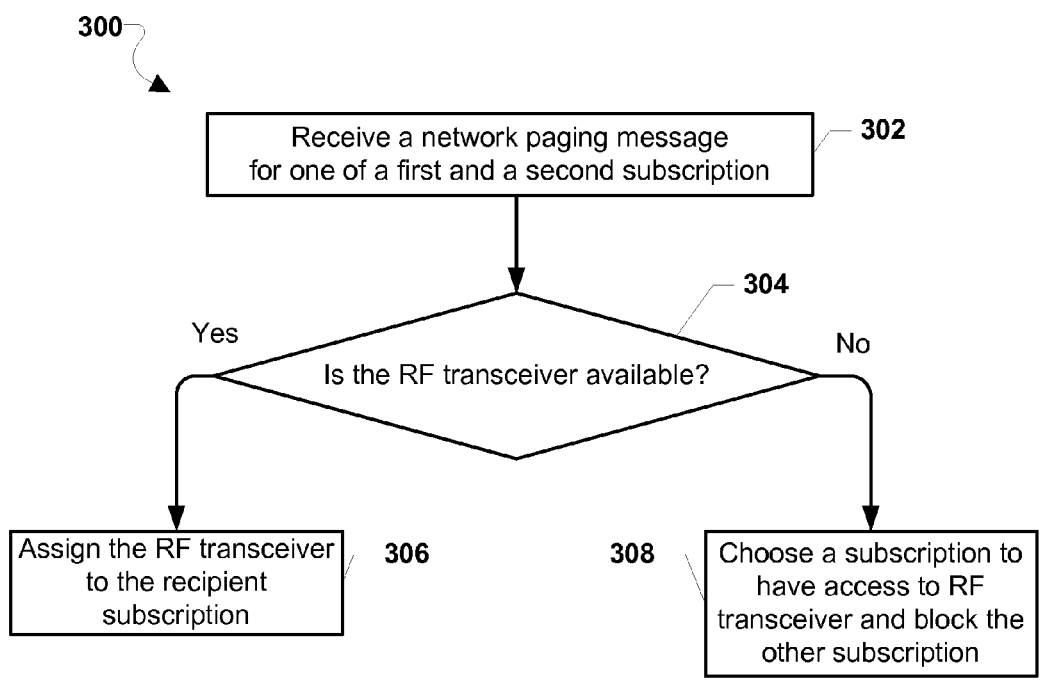
FIG. 3 is a process flow diagram illustrating an embodiment mobile communication device method for processing a network paging message on a DSDS communication device.

FIG. 3 illustrates an embodiment method 300 for processing a collision on a mobile communication device. In block 302, a mobile communication device 120 may receive a network paging message for one of a first subscription 202 and a second subscription 212 (i.e., a recipient subscription). Because only one subscription may have access to the mobile communication device's RF transceiver at any one time, in decision block 304 the mobile communication device 120 may determine whether the RF transceiver is available. The shared radio resource may be unavailable when the RF transceiver is in use by the non-recipient subscription (i.e., whether there is a paging collision 220). If the mobile communication device 120 determines that the RF transceiver is available (i.e., determination 304="Yes"), then the mobile communication device 120 may assign the RF transceiver to the recipient subscription in block 306. Otherwise (i.e., determination 304="No"), the mobile communication device 202 may choose a subscription to have access to the RF transceiver and may block the other subscription from using the RF transceiver in block 308. The subscription that is given access to the RF transceiver in block 308 may then complete its paging communication or paging communications with its mobile network. In the various embodiments, a mobile communication device 120 may utilize one of several strategies for choosing the subscription that receives access to the RF transceiver. For example, the mobile communication device 120 may utilize a Round-Robin strategy to process paging collisions and, therefore, alternate which subscription is blocked in block 308 each time a paging collision 220 occurs.

Figure 4:
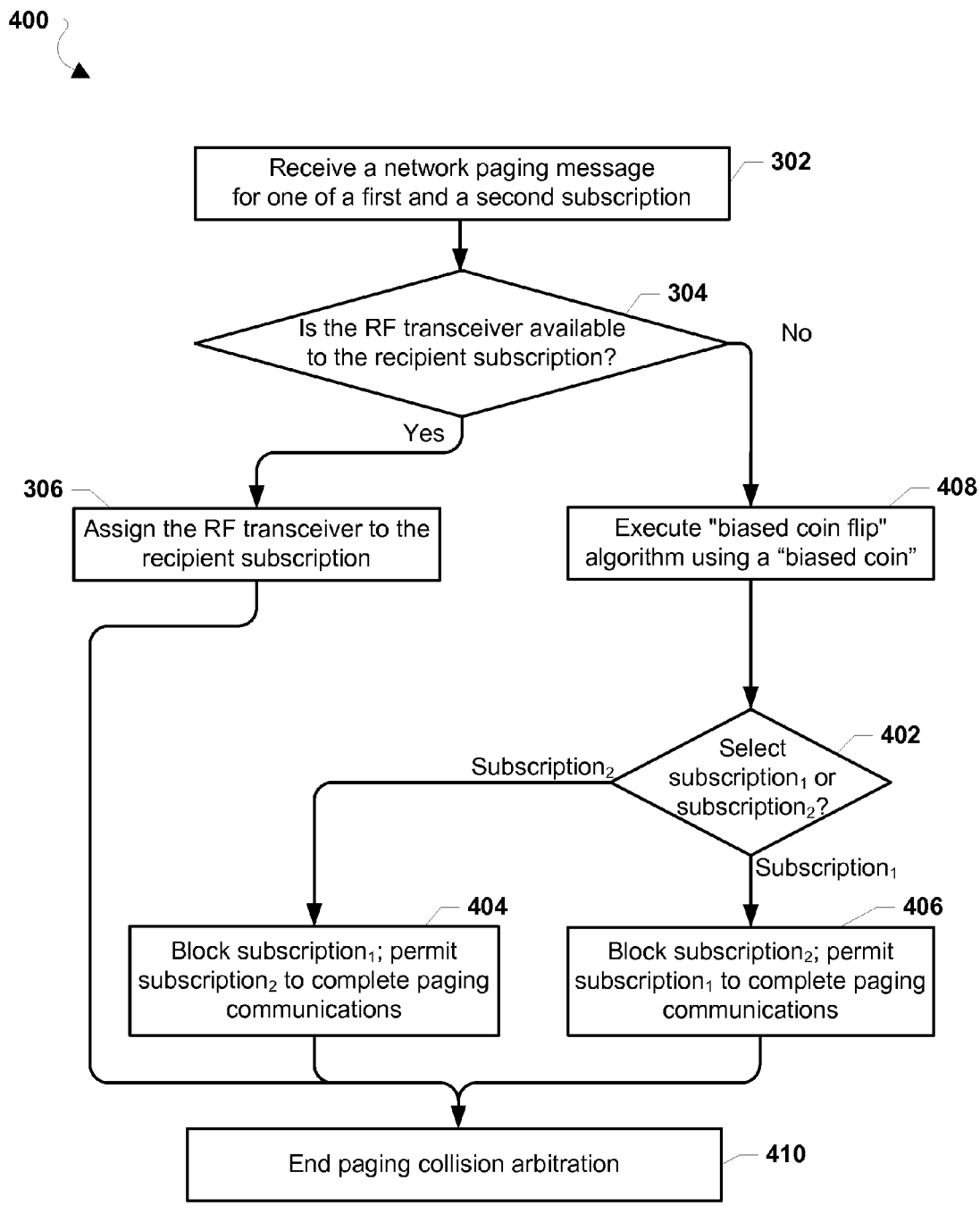
FIG. 4 is a process flow diagram illustrating an embodiment mobile communication device method for processing a network paging message on a DSDS communication device using a biased coin toss algorithm.

FIG. 4 illustrates an embodiment mobile communication device method 400 for managing paging collisions to create equal paging blocking rates between two subscriptions. In block 302, a mobile communication device 120 may receive a network paging message for one of a first and a second subscription (i.e., a recipient subscription). As described above, the mobile communication device 120 may then determine in determination block 304 whether an RF transceiver is available to a recipient subscription. If the RF transceiver is available to the recipient subscription (i.e., determination 304="No" because there is no paging collision 220), the mobile communication device 120 may assign the RF transceiver to the recipient subscription in block 306. The mobile communication device 120 may then end the paging collision arbitration in block 410.

If the RF transceiver is unavailable to the recipient subscription (i.e., determination 304="Yes" because of a paging collision 220), the mobile communication device 120 may execute a coin flip algorithm using a biased coin in block 408. A biased coin is a random variable calculation that may have probability to be "heads or tails" (1 or 0) so that over time the average of the "coin toss" algorithm implementations will approach the predefined or preset probabilities, but any given coin toss is one value or the other. The biased coin toss algorithm is further explained below with reference to FIGS. 5 and 6. Regardless of the particular biased coin toss algorithm implemented, the mobile communication device 120 may then determine in determination block 402 the subscription that was selected to receive the RF transceiver. If the biased coin toss algorithm selects the second subscription 212 (i.e., determination 402="Subscription$_2$"), the mobile communication device 120 in block 404 may block the first subscription's access to the RF transceiver and permit the second subscription 212 to complete its paging communications with a second mobile network 104. Otherwise (i.e., determination 402="Subscription$_1$"), in block 406, the mobile communication device 120 may block the second subscription's access to the RF transceiver and permit the first subscription 202 to complete paging communications with a first mobile network 102. The mobile communication device may then end the paging collision arbitration in block 410.

Figure 5:
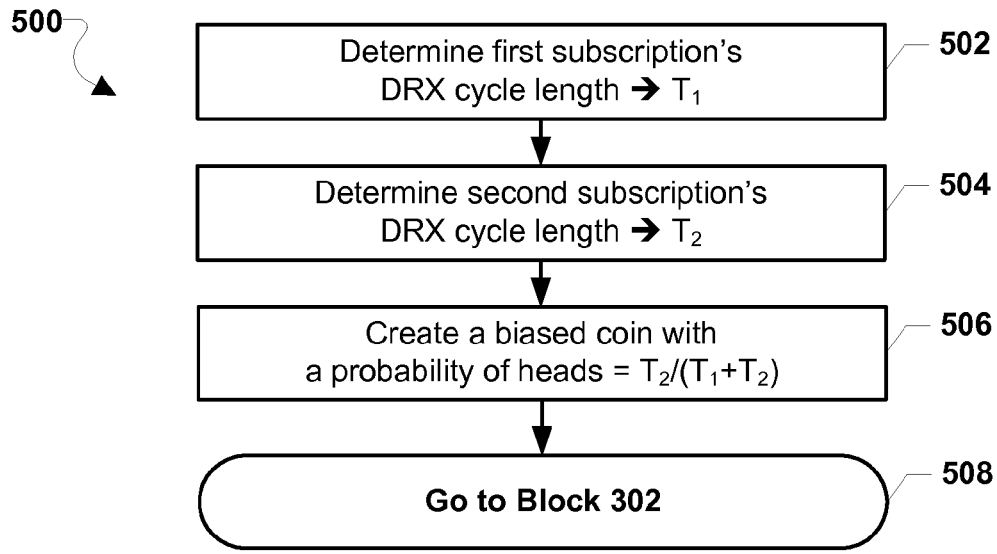
FIG. 5 is a process flow diagram illustrating an embodiment mobile communication device method for implementing a biased coin toss algorithm to equalize the paging block rates for subscriptions on a DSDS communication device.

FIG. 5 illustrates an embodiment mobile communication device method 500 for initializing a biased coin for use with a biased coin toss algorithm. In an embodiment, after a mobile communication device 120 attaches to two mobile networks, a mobile communication device 120 may determine the paging blocking rate for a first subscription 202 using the DRX cycle length of a first subscription 206 (i.e., $T_1$) and a paging blocking rate for a second subscription 212 using the DRX cycle length of a second subscription 216 (i.e., $T_2$). In another embodiment, a mobile communication device 120 may recalculate $T_1$ in the event that the DRX cycle length of a first subscription 206 changes. The mobile communication device may also recalculate $T_2$ in the event that the DRX cycle length of a second subscription 212 changes.

In an embodiment, in block 502, a mobile communication device 120 may determine a first subscription's DRX cycle length 206 (i.e., $T_1$). The mobile communication device 120 may also determine the DRX cycle length 216 for a second subscription 212 (i.e., $T_2$) in block 504. For example, after attaching to two mobile networks, the mobile communication device 120 may obtain the values for both $T_1$ and $T_2$ by monitoring each subscription's DRX cycle length and measuring the length of time between the start of one DRX cycle and the beginning of the next DRX cycle. As the values for $T_1$ and $T_2$ are set by a first mobile network 102 and a second mobile network 104, respectively, the mobile communication device 120 may, as another example, directly receive these values from the respective mobile networks. In another embodiment, a mobile communication device 120 may update the values of $T_1$ and $T_2$ to reflect any changes to each respective subscription's DRX cycle.

After obtaining or determining the values for $T_1$ and $T_2$, the mobile communication device 120 may configure the biased coin algorithm (effectively create a biased coin) with a probability of heads equal to $T_2/(T_1+T_2)$ in block 506. In an embodiment of a biased coin toss algorithm, the probability of blocking a first subscription 202 and allowing a second subscription to 212 complete its paging session may be equal to $T_2/(T_1+T_2)$ (i.e., "heads"). The probability of blocking a second subscription 212 and allowing a first subscription 202 to complete its paging session may be equal to $T_1/(T_1+T_2)$ (i.e., "tails"). In transition block 508, the mobile communication device may continue operating in block 302. Using the bias coin created in block 506 in the coin toss algorithm described above with reference to FIG. 4 will result in approximately equal treatment for the two subscriptions over time.

Figure 6:
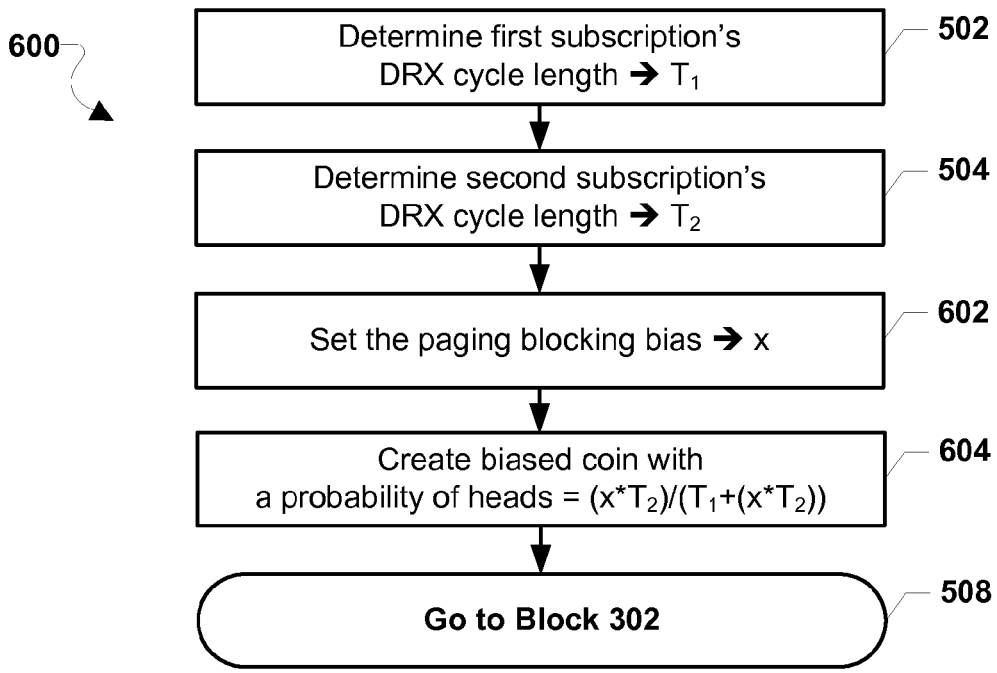
FIG. 6 is a process flow diagram illustrating an embodiment mobile communication device method for implementing a biased coin toss algorithm to set the paging blocking rates for subscriptions on a DSDS communication device.

FIG. 6 illustrates an embodiment mobile communication device method 600 for initializing a biased coin for use in implementing a biased-coin algorithm that allows a mobile communication device 120 to set the paging blocking rate between two subscriptions. The mobile communication device 120 may determine the DRX cycle length of a first subscription 202 (i.e., $T_1$) in block 502. The mobile communication device may also determine the DRX cycle length of a second subscription 212 (i.e., $T_2$) in block 504. In block 602, the mobile communication device 120 may set the paging blocking bias (i.e., x). The paging blocking bias may be a nonnegative, real number and may be set or changed by various means.

The value for the paging blocking bias (i.e., x) may be set by various entities, including, but not limited to, the manufacturer of the mobile communication device, a mobile network, or a user of the mobile communication device. The paging blocking bias may also be changed by various individuals using various interface mechanisms after being set initially. For example, the mobile communication device may receive a user input via a user interface that specifies a new paging blocking bias. In such a case, the biased coin toss algorithm may use the new value of the paging blocking bias when executing a biased coin toss algorithm. In an embodiment, the mobile communication device 120 may implement a biased coin that includes new values for at least one of x, $T_1$ and $T_2$. In other words, the communication device 120 may reinitialize the biased coin. For example, the mobile communication device 120 may implement new values for $T_1$ and $T_2$ to reflect changes made to each respective subscription's DRX cycle. In another example, the mobile communication device 120 may reinitialize the biased coin to implement a new x value.

The mobile communication device 120 may create a biased coin in block 604 with a probability of heads equal to $(x*T_2)/(T_1+(x*T_2))$. When used in the biased coin toss algorithm described in FIG. 4, the biased coin creates a probability of blocking a first subscription 202 and allowing a second subscription 212 to complete its paging session equal to $(x*T_2)/(T_1+(x*T_2))$ (i.e., "heads"). The probability of blocking a second subscription 212 and allowing a first subscription 202 to complete its paging session is equal to $(T_1)/(T_1+(x*T_2))$ (i.e., "tails"). By biasing the coin toss algorithm using the paging blocking bias (i.e., x), the ratios of DRX cycle lengths may be made to result in predictable treatment for the two subscriptions over time. For example, a paging blocking bias value may be set (e.g., x=0.2) so that a first subscription 202 has a lower paging blocking rate than a second subscription 212's rate because the biased coin toss algorithm selects the first subscription 202 to prevail more frequently than a second subscription 212 when paging collisions occur. The opposite result may be achieved if the biased coin toss algorithm uses a paging blocking bias value (e.g., x=5) that causes the second subscription 212 to prevail more frequently than the first subscription 202 when paging collisions occur.

Returning to FIG. 6, the mobile communication device 120 may transition to block 302 in FIG. 4 from block 508. The operations in block 302 in FIG. 4 may correspond to the start of a biased coin toss algorithm implemented when the mobile communication device 120 receives a page for one of a first and second subscription.

Figure 7:
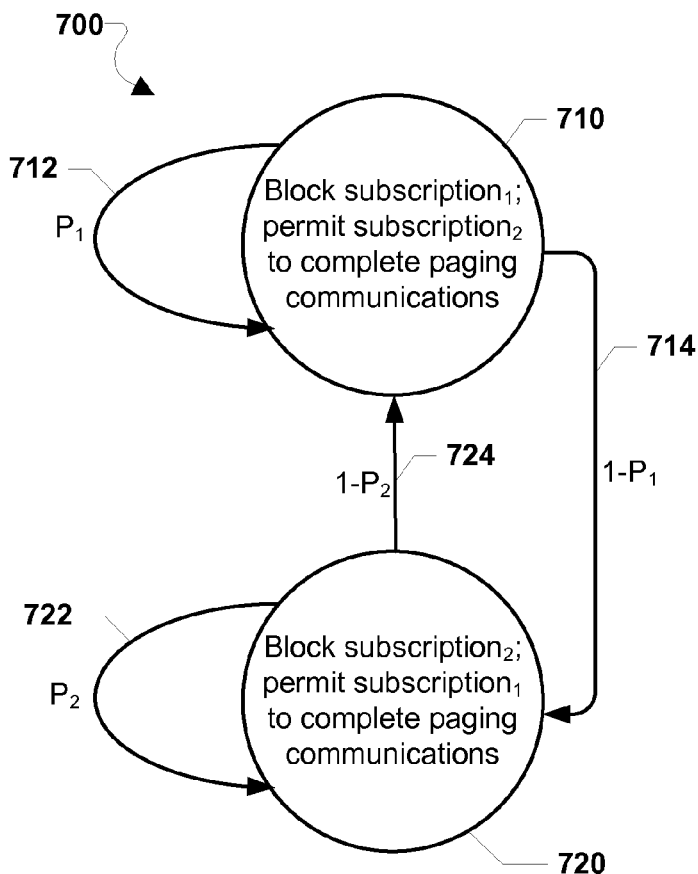
FIG. 7 is a process flow diagram illustrating an embodiment mobile communication device method for implementing a Markov chain algorithm to set the paging blocking rates for subscriptions on a DSDS communication device.
Figure 8:
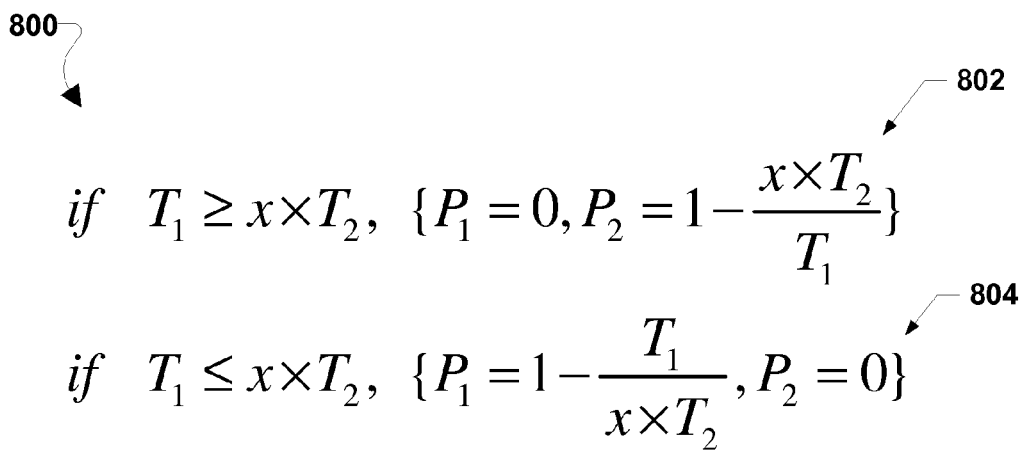
FIG. 8 is an illustration of an embodiment mobile communication device of the mathematical formulas that define the rules for transitioning between states in an implementation of a Markov chain.

FIG. 7 illustrates an embodiment method for implementing a two-state Markov chain 700 that uses a paging blocking bias based on embodiment transition rules 800, which are described in FIG. 8. A mobile communication device 120 may implement a two-state Markov chain (i.e., a finite state machine) with a starting state and may create rules for transitioning between a first state 710 and a second state 720. A Markov chain's two states may correspond to two respective actions performed on a first subscription 202 and a second subscription 212 when a paging collision 220 occurs. In a first state 710 of the Markov chain, a mobile communication device may block a first subscription 202's access to the RF transceiver and allow a second subscription to complete its paging communications with a mobile network 104. In a second state 720 of the Markov chain, the mobile communication device 120 may instead allow a first subscription to complete paging communications with a first mobile network 102 and block a second subscription 212 from accessing a second mobile network 104.

In an embodiment, a Markov chain may also have transition rules for a first state 710 based on the value of $P_1$ and for a second state 720 based on the value of $P_2$ that may define how a mobile communication device 120 transitions between states. The values for $P_1$ and $P_2$ may be defined by the following equations:

$$\text{if } T_1 \geq x \times T_2, \left\{ P_1 = 0, P_2 = 1 - \frac{x \times T_2}{T_1} \right\}$$

$$\text{if } T_1 < x \times T_2, \left\{ P_1 = 1 - \frac{T_1}{x \times T_2}, P_2 = 0 \right\}$$

where:
$T_1$ is the DRX cycle length 206 of a first subscription 202;
$T_2$ is the DRX cycle length 216 of a second subscription 212; and
x is the selected paging blocking bias.

A first equation 802 defines the values for $P_1$ and $P_2$ when a first subscription 202's DRX cycle length is greater than or equal to the product of a second subscription 212's DRX cycle length multiplied by the paging blocking bias (i.e., when $T_1 \geq x*T_2$). A second equation 804 defines the values for $P_1$ and $P_2$ when the DRX cycle length of a first subscription 202 is less than the product of the DRX cycle length of a second subscription 212 multiplied by the paging blocking bias (i.e., when $T_1 \leq x*T_2$). $P_1$ and $P_2$ each represent probabilities from 0.0 to 1.0 that a particular transition will occur. A mobile communication device 120, for example, may generate a pseudorandom number from 0.0 to 1.0 to determine the transition to follow from any given state in the Markov chain.

In an embodiment, each state in the Markov chain 700 may have two transitions types. One transition type may change the current state to the other state in the Markov chain 700. For example, a first state 710 may transition to a second state through a transition 714, and a second state 720 may transition to a first state through a transition 724. The second type of transition may not change the current state. For example, a first state 710 may transition to itself through a transition 712, and a second state 720 may transition to itself via a transition 722.

Figure 9:
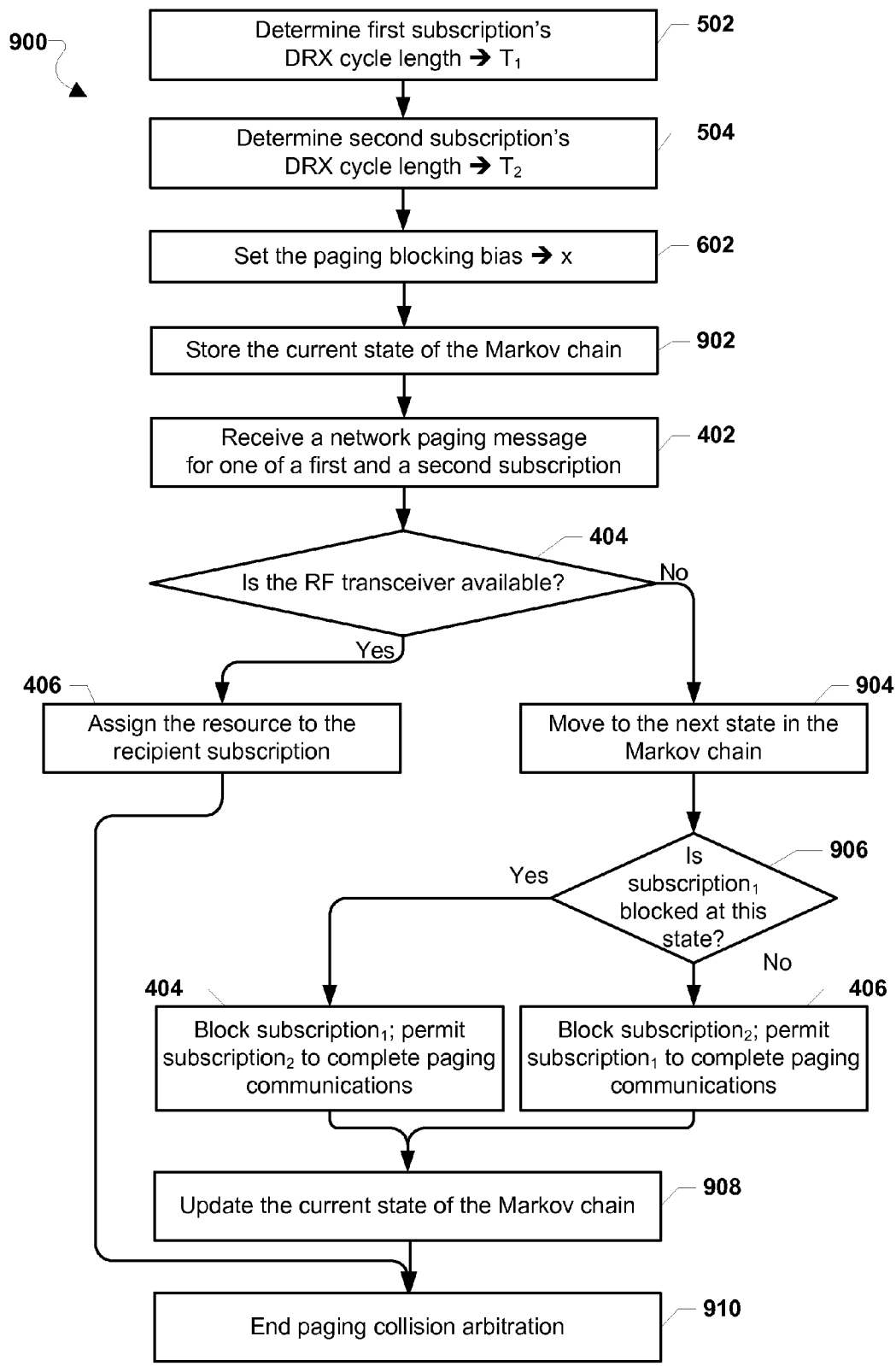
FIG. 9 is a process flow diagram illustrating an embodiment mobile communication device method for processing a network paging messages on a DSDS communication device using a Markov chain implementation.

FIG. 9 illustrates an embodiment method 900 for implementing a Markov chain to control the paging blocking rates of two subscriptions. By using the Markov chain algorithm, a mobile communication device 120 may utilize previous paging collision results when arbitrating a current paging collision. This awareness of previous results may enable the mobile communication device 120 to avoid the possibility that a limited series of paging collision determinations may be made that are counter to the desired bias (i.e., either no bias or a specified bias). For example, a Markov chain may enable the mobile communication device 120 to avoid consecutively blocking pages for one particular subscription, which may otherwise disrupt implementing the paging block bias and that could occur randomly even using a biased coin algorithm.

In various embodiments, a mobile communication device 120 may initialize a Markov chain. In block 502, a mobile communication device 120 may determine the DRX cycle length of a first subscription 202 (i.e., $T_1$). The mobile communication device 120 may also determine the DRX cycle length of a second subscription 212 (i.e., $T_2$) in block 504. In an embodiment, the mobile communication device 120 may determine the DRX cycle lengths for the first and second subscription 202, 212 upon attaching to two mobile networks. As discussed above, the mobile communication device 120 may also set a paging blocking bias (i.e., x) in block 602 through various means. In another embodiment, the mobile communication device 120 may implement a Markov chain that includes new values for at least one of x, $T_1$ and $T_2$. In other words, the communication device 120 may reinitialize the Markov chain. For example, the mobile communication device 120 may implement new values for $T_1$ and $T_2$ to reflect changes made to each respective subscription's DRX cycle. In another example, the mobile communication device 120 may reinitialize the biased coin to implement a new x value.

In block 902, the mobile communication device 120 may store the current state of the Markov chain. The current state of the Markov chain may be a first state 710 or a second state 720, depending on which state is the initial state. For example, the mobile communication device 120 may select and store an initial state in the Markov chain that corresponds either to blocking a first subscription 202 or blocking a second subscription 212.

In an embodiment, a mobile communication device 120 may receive a network paging message in block 402 for one of a first subscription 202 or a second subscription 212 (i.e., a recipient subscription) from a mobile network. In determination block 404, the mobile communication device 120 may determine whether the RF transceiver is available for the recipient subscription (i.e., whether there is a paging collision). If the RF transceiver is available (i.e., determine 404="Yes"), the mobile communication device may assign the RF transceiver to the recipient subscription in block 406. The mobile communication device 120 may end the paging collision arbitration in block 910.

If the RF transceiver is not available (i.e., determination 404="No" because there is a paging collision 220), the mobile communication device may move to the next state in the Markov chain from the current state, in block 904. After transitioning states, the mobile communication device 120 may determine the subscription to block based on the new current state in determination block 906. If the current state indicates that the first subscription 202 should be blocked (i.e., determination block 906="Yes"), the mobile communication device may block that subscription and permit the second subscription 212 to complete its paging communications with a second mobile network 104 in block 404. If the current state indicates that the second subscription 212 should be blocked (i.e., determination block 906="Yes"), the mobile communication device 120 may block that subscription and permit the first subscription 202 to complete its paging communications with a first mobile network 102 in block 406. Regardless of which subscription is blocked, after the mobile communication device 120 allocates the RF transceiver, the mobile communication device 120 may update the current state of the Markov chain in block 908. In an embodiment, the mobile communication device 120 may use the updated current state of the Markov chain when resolving a subsequent paging collision. The mobile communication device 120 may then end the paging collision arbitration in block 910.

Figure 10:
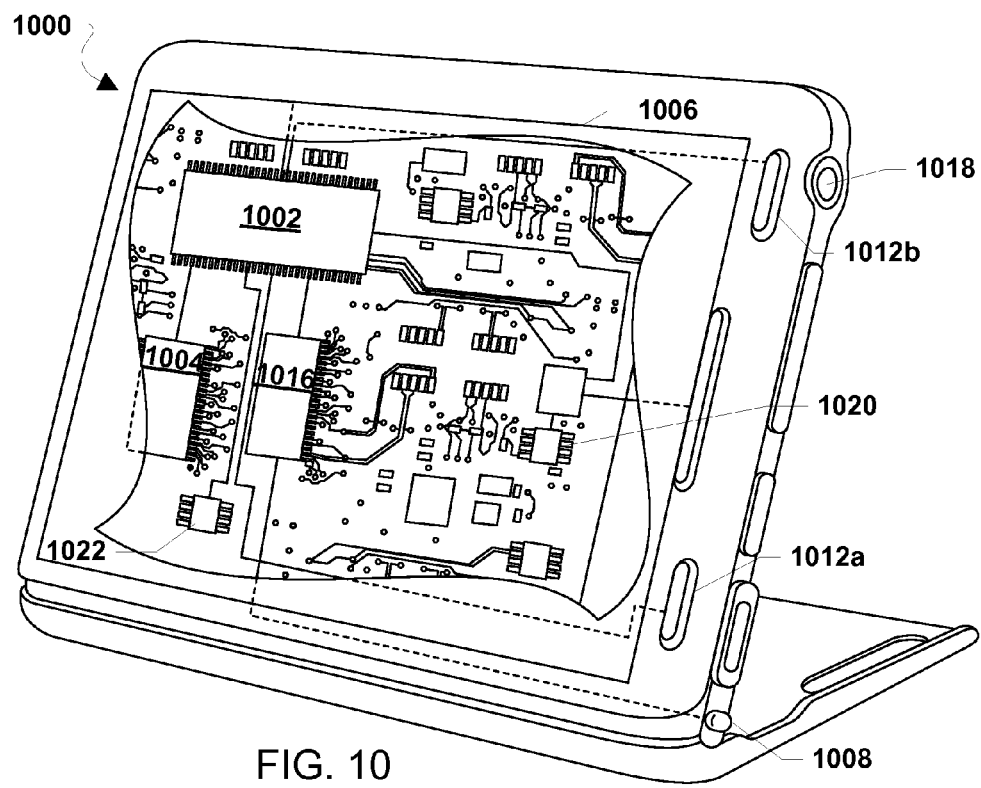
FIG. 10 is a component diagram of an example mobile communication device suitable for use with the various embodiments.

The various embodiments may be implemented in any of a variety of mobile communication devices, an example of which is illustrated in FIG. 10. For example, the mobile communication device 1000 may include a processor 1002 coupled to internal memory 1004. Internal memory 1004 may be volatile or non-volatile memory, and may also be secure and/or encrypted memory, or unsecure and/or unencrypted memory, or any combination thereof. The processor 1002 may also be coupled to a touch screen display 1006, such as a resistive-sensing touch screen, capacitive-sensing touch screen infrared sensing touch screen, or the like. Additionally, the display of the mobile communication device 1000 need not have touch screen capability. Additionally, the mobile communication device 1000 may have one or more antenna 1008 for sending and receiving electromagnetic radiation that may be connected to a wireless data link and/or cellular telephone transceiver 1016 coupled to the processor 1002. The mobile communication device 1000 may also include physical buttons 1012a and 1012b for receiving user inputs. The mobile communication device 1000 may also include a power button 1018 for turning the mobile communication device 1000 on and off. The mobile communication device 1000 may have a first SIM card 1020 and a second SIM card 1022 that utilize a cellular telephone transceiver 1016 and one or more antennae 1008 to connect to a first and a second mobile network, respectively.

Figure 11:
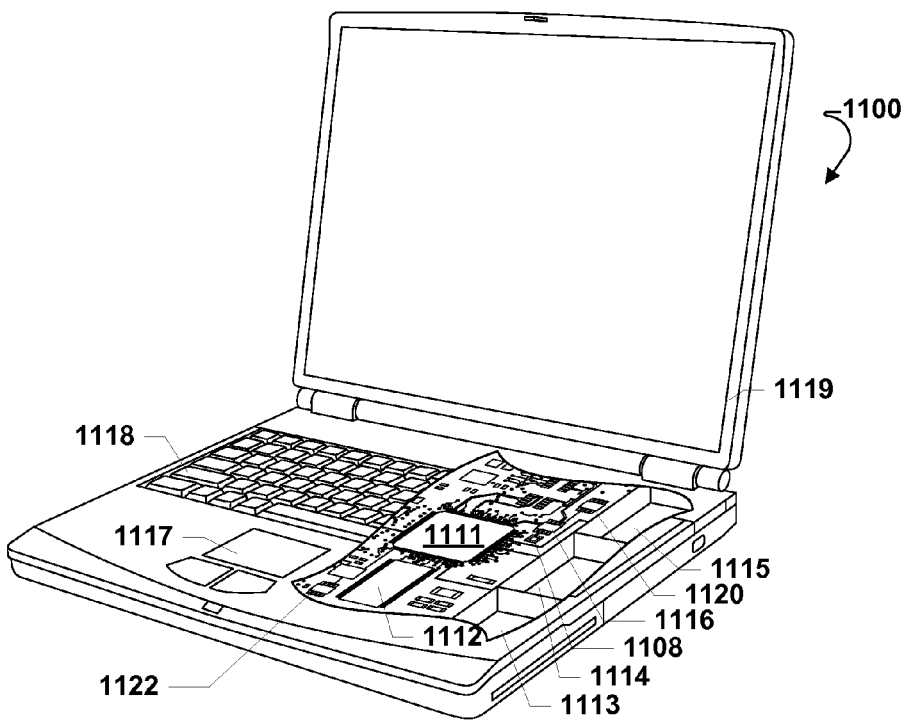
FIG. 11 is a component diagram of another example mobile communication device suitable for use with the various embodiments.

The various embodiments described above may also be implemented within a variety of mobile communication devices, such as a laptop computer 1100 illustrated in FIG. 11. Many laptop computers include a touch pad touch surface 1117 that serves as the computer's pointing device, and thus may receive drag, scroll, and flick gestures similar to those implemented on mobile computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the computing device may include a computer mouse or trackball coupled to the processor (e.g., via a USB input) as are well known, which may also be use in conjunction with the various embodiments. The computer 1100 may have a first SIM card 1120 and a second SIM card 1122 that utilize a cellular telephone transceiver 1116 and one or more antennae 1108 to connect to a first and a second mobile network, respectively.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of resolving a paging collision between a first subscription and a second subscription on a wireless communication device, comprising:
    initializing a biased selection with a first probability of selecting the first subscription and a second probability of selecting the second subscription in response to the wireless communication device attaching to two mobile networks, wherein each of the first probability and the second probability is calculated based on cycle lengths of respective discontinuous reception periods for the first subscription and the second subscription;
    applying the biased selection to select one of the first subscription and the second subscription in response to detecting the paging collision; and
    completing a paging communication for one of the first subscription and the second subscription based on a result of the biased selection.

2. The method of claim 1, wherein initializing the biased selection in response to attaching to the two mobile networks comprises:
    setting a probability of selecting the first subscription to complete the paging communication equal to $T_2/(T_1+T_2)$; and
    setting a probability of selecting the second subscription to complete the paging communication equal to $T_1/(T_1+T_2)$, wherein:
        $T_1$ is a cycle length of a discontinuous reception period for the first subscription; and
        $T_2$ is a cycle length of a discontinuous reception period for the second subscription.

3. The method of claim 1, wherein initializing the biased selection in response to attaching to the two mobile networks comprises:
    setting a probability of selecting the first subscription to complete the paging communication equal to $(x*T_2)/(T_1+(x*T_2))$; and
    setting a probability of selecting the second subscription to complete the paging communication equal to $T_1/(T_1+(x*T_2))$, wherein:
        $T_1$ is a cycle length of a discontinuous reception period for the first subscription;
        $T_2$ is a cycle length of a discontinuous reception period for the second subscription; and
        x is a paging blocking bias value.

4. The method of claim 1, further comprising reinitializing the biased selection when at least one of a discontinuous reception period for the first subscription, a discontinuous reception period for the second subscription, and a paging blocking bias is changed.

5. The method of claim 1 wherein the biased selection is a biased coin algorithm.

6. A method of resolving a paging collision between a first subscription and a second subscription on a dual-subscriber identity module (SIM)-dual-standby communication device, comprising:
    initializing a Markov chain algorithm with a first state and a second state in response to the dual-SIM-dual-standby communication device attaching to two mobile networks;
    using the Markov chain algorithm to select one of the first subscription and the second subscription in response to detecting the paging collision; and completing a paging communication for one of the first subscription and the second subscription based on a result of the Markov chain algorithm.

7. The method of claim 6, further comprising reinitializing the Markov chain algorithm when at least one of a discontinuous reception period for the first subscription, a discontinuous reception period for the second subscription, and a paging blocking bias is changed.

8. The method of claim 6, wherein initializing the Markov chain algorithm comprises:
creating rules for transitioning between the first and second states;
selecting an initial state, wherein the initial state is one of the first and second states; and
determining values for $T_1$, $T_2$, and x, wherein,
$T_1$ is a cycle length of a discontinuous reception period for the first subscription;
$T_2$ is a cycle length of a discontinuous reception period for the second subscription; and
x is a paging blocking bias value.

9. The method of claim 8, wherein the rules for transitioning between the first and second states comprise:
transitioning from the first state to the second state with a probability of $P_1$;
transitioning from the second state to the first state with a probability of $P_2$;
transitioning from the first state to the first state with a probability of $(1-P_1)$; and
transitioning from the second state to the second state with a probability of $(1-P_2)$.

10. The method of claim 9, wherein $T_1$ is greater than or equal to $(x*T_2)$.

11. The method of claim 10, wherein:
$P_1$ is zero; and
$P_2$ is $1-((x*T_2)/T_1)$.

12. The method of claim 8, wherein $T_1$ is less than $(x*T_2)$.

13. The method of claim 12, wherein:
$P_1$ is $1-(T_1/(x*T_2))$; and
$P_2$ is zero.

14. The method of claim 6, wherein using the Markov chain algorithm to select one of the first subscription and the second subscription comprises:
transitioning to a new current state;
selecting one of the first subscription and the second subscription based on the new current state; and
storing the new current state in memory for use in resolving a subsequent paging collision.

15. The method of claim 14, wherein selecting one of the first subscription and the second subscription based on the new current state comprises:
selecting the first subscription when the new current state is the second state; and
selecting the second subscription when the new current state is the first state.

16. A wireless communication device, comprising
a processor configured with processor-executable instructions to:
initialize a biased selection with a first probability of selecting a first subscription and a second probability of selecting a second subscription in response to attaching to two mobile networks, wherein each of the first probability and the second probability is calculated based on cycle lengths of respective discontinuous reception periods for the first subscription and the second subscription;
apply the biased selection to select one of the first subscription and the second subscription in response to detecting a paging collision between the first subscription and the second subscription; and
complete a paging communication for one of the first subscription and the second subscription based on a result of the biased selection.

17. The wireless communication device of claim 16, wherein to initialize the biased selection in response to attaching to the two mobile networks the processor is further configured with processor-executable instructions to:
set a probability of selecting the first subscription to complete the paging communication equal to $T_2/(T_1+T_2)$; and
set a probability of selecting the second subscription to complete the paging communication equal to $T_1/(T_1+T_2)$, wherein:
$T_1$ is a cycle length of a discontinuous reception period for the first subscription; and
$T_2$ is a cycle length of a discontinuous reception period for the second subscription.

18. The wireless communication device of claim 16, wherein to initialize the biased selection in response to attaching to the two mobile networks the processor is further configured with processor-executable instructions to:
set a probability of selecting the first subscription to complete the paging communication equal to $(x*T_2)/(T+(x*T_2))$; and
set a probability of selecting the second subscription to complete the paging communication equal to $T_1/(T_1+(x*T_2))$, wherein:
$T_1$ is a cycle length of a discontinuous reception period for the first subscription;
$T_2$ is a cycle length of a discontinuous reception period for the second subscription; and
x is a paging blocking bias value.

19. The wireless communication device of claim 16, wherein the processor is further configured with processor-executable instructions to reinitialize the biased selection when at least one of a discontinuous reception period for the first subscription, a discontinuous reception period for the second subscription, and a paging blocking bias is changed.

20. The wireless communication device of claim 16 wherein the biased selection is a biased coin algorithm.

21. The wireless communication device of claim 16, wherein the processor is coupled to a first subscriber identity module (SIM) and a second SIM, and wherein the first subscription is associated with the first SIM and the second subscription is associated with the second SIM.

22. A dual-subscriber identity module (SIM)-dual-standby communication device, comprising
a processor configured with processor-executable instructions to:
initialize a Markov chain algorithm with a first state and a second state in response to attaching to two mobile networks;
use the Markov chain algorithm to select one of a first subscription and a second subscription in response to detecting a paging collision between the first subscription and the second subscription; and
complete a paging communication for one of the first subscription and the second subscription based on a result of the Markov chain algorithm.

23. The dual-SIM-dual-standby communication device of claim 22, wherein the processor is further configured with processor-executable instructions to reinitialize the Markov chain algorithm when at least one of a discontinuous reception period for the first subscription, a discontinuous reception period for the second subscription, and a paging blocking bias is changed.

24. The dual-SIM-dual-standby communication device of claim 22, wherein to initialize the Markov chain algorithm the processor is further configured with processor-executable instructions to:
   create rules for transitioning between the first and second states;
   select an initial state, wherein the initial state is one of the first and second states; and
   determine values for $T_1$, $T_2$, and x, wherein,
      $T_1$ is a cycle length of a discontinuous reception period for the first subscription;
      $T_2$ is a cycle length of a discontinuous reception period for the second subscription; and
      x is a paging blocking bias value.

25. The dual-SIM-dual-standby communication device of claim 24, wherein the rules for transitioning between the first and second states comprise:
   transitioning from the first state to the second state with a probability of $P_1$;
   transitioning from the second state to the first state with a probability of $P_2$;
   transitioning from the first state to the first state with a probability of $(1-P_1)$; and
   transitioning from the second state to the second state with a probability of $(1-P_2)$.

26. The dual-SIM-dual-standby communication device of claim 25, wherein $T_1$ is greater than or equal to $(x*T_2)$.

27. The dual-SIM-dual-standby communication device of claim 26, wherein:
   $P_1$ is zero; and
   $P_2$ is $1-((x*T_2)/T_1)$.

28. The dual-SIM-dual-standby communication device of claim 24, wherein $T_1$ is less than $(x*T_2)$.

29. The dual-SIM-dual-standby communication device of claim 28, wherein:
   $P_1$ is $1-(T_1/(x*T_2))$; and
   $P_2$ is zero.

30. The dual-SIM-dual-standby communication device of claim 22, wherein to use the Markov chain algorithm to select one of the first subscription and the second subscription the processor is further configured with processor-executable instructions to:
   transition to a new current state;
   select one of the first subscription and the second subscription based on the new current state; and
   store the new current state for use in resolving a subsequent paging collision.

31. The dual-SIM-dual-standby communication device of claim 30, wherein to select one of the first subscription and the second subscription based on the new current state the processor is configured with processor-executable instructions to:
   select the first subscription when the new current state is the second state; and
   select the second subscription when the new current state is the first state.

32. A wireless communication device, comprising:
   means for initializing a biased selection with a first probability of selecting a first subscription and a second probability of selecting a second subscription in response to attaching to two mobile networks, wherein each of the first probability and the second probability is calculated based on cycle lengths of respective discontinuous reception periods for the first subscription and the second subscription;
   means for applying the biased selection to select one of the first subscription and the second subscription in response to detecting a paging collision between the first subscription and the second subscription; and
   means for completing a paging communication for one of the first subscription and the second subscription based on a result of the biased selection.

33. The wireless communication device of claim 32, wherein means for initializing the biased selection in response to attaching to the two mobile networks comprises:
   means for setting a probability of selecting the first subscription to complete the paging communication equal to $T_2/(T_1+T_2)$; and
   means for setting a probability of selecting the second subscription to complete the paging communication equal to $T_1/(T_2+T_2)$, wherein:
      $T_1$ is a cycle length of a discontinuous reception period for the first subscription; and
      $T_2$ is a cycle length of a discontinuous reception period for the second subscription.

34. The wireless communication device of claim 32, wherein means for initializing the biased selection in response to attaching to the two mobile networks comprises:
   means for setting a probability of selecting the first subscription to complete the paging communication equal to $(x*T_2)/(T_1+(x*T_2))$; and
   means for setting a probability of selecting the second subscription to complete the paging communication equal to $T_1/(T_1+(x*T_2))$, wherein:
      $T_1$ is a cycle length of a discontinuous reception period for the first subscription;
      $T_2$ is a cycle length of a discontinuous reception period for the second subscription; and
      x is a paging blocking bias value.

35. The wireless communication device of claim 32, further comprising means for reinitializing the biased selection when at least one of a discontinuous reception period for the first subscription, a discontinuous reception period for the second subscription, and a paging blocking bias is changed.

36. The wireless communication device of claim 32 wherein the biased selection is a biased coin algorithm.

37. A dual-subscriber identity module (SIM)-dual-standby communication device, comprising:
   means for initializing a Markov chain algorithm with a first state and a second state in response to attaching to two mobile networks;
   means for using the Markov chain algorithm to select one of a first subscription and a second subscription in response to detecting a paging collision between the first subscription and the second subscription; and
   means for completing a paging communication for one of the first subscription and the second subscription based on a result of the Markov chain algorithm.

38. The dual-SIM-dual-standby communication device of claim 37, further comprising means for reinitializing the Markov chain algorithm when at least one of a discontinuous reception period for the first subscription, a discontinuous reception period for the second subscription, and a paging blocking bias is changed.

39. The dual-SIM-dual-standby communication device of claim 37, wherein means for initializing the Markov chain algorithm comprises:
   means for creating rules for transitioning between the first and second states;

means for selecting an initial state, wherein the initial state is one of the first and second states; and means for determining values for $T_1$, $T_2$, and x, wherein,
$T_1$ is a cycle length of a discontinuous reception period for the first subscription;
$T_2$ is a cycle length of a discontinuous reception period for the second subscription; and
x is a paging blocking bias value.

40. The dual-SIM-dual-standby communication device of claim 39, wherein the rules for transitioning between the first and second states comprise:
transitioning from the first state to the second state with a probability of $P_1$;
transitioning from the second state to the first state with a probability of $P_2$;
transitioning from the first state to the first state with a probability of $(1-P_1)$; and
transitioning from the second state to the second state with a probability of $(1-P_2)$.

41. The dual-SIM-dual-standby communication device of claim 40, wherein $T_1$ is greater than or equal to $(x*T_2)$.

42. The dual-SIM-dual-standby communication device of claim 41, wherein:
$P_1$ is zero; and
$P_2$ is $1-((x*T_2)/T_1)$.

43. The dual-SIM-dual-standby communication device of claim 39, wherein $T_1$ is less than $(x*T_2)$.

44. The dual-SIM-dual-standby communication device of claim 43, wherein:
$P_1$ is $1-(T_1/(x*T_2))$; and
$P_2$ is zero.

45. The dual-SIM-dual-standby communication device of claim 37, wherein means for using the Markov chain algorithm to select one of the first subscription and the second subscription comprises:
means for transitioning to a new current state;
means for selecting one of the first subscription and the second subscription based on the new current state; and
means for storing the new current state in memory for use in resolving a subsequent paging collision.

46. The dual-SIM-dual-standby communication device of claim 45, wherein means for selecting one of the first subscription and the second subscription based on the new current state comprises:
means for selecting the first subscription when the new current state is the second state; and
means for selecting the second subscription when the new current state is the first state.

47. A non-transitory processor-readable storage medium having stored thereon processor-executable software instructions configured to cause a processor of a wireless communication device to perform operations comprising:
initializing a biased selection with a first probability of selecting a first subscription and a second probability of selecting a second subscription in response to the wireless communication device attaching to two mobile networks, wherein each of the first probability and the second probability is calculated based on cycle lengths of respective discontinuous reception periods for the first subscription and the second subscription;
applying the biased selection to select one of the first subscription and the second subscription in response to detecting a paging collision between the first subscription and the second subscription; and
completing a paging communication for one of the first subscription and the second subscription based on a result of the biased selection.

48. The non-transitory processor-readable storage medium of claim 47, wherein the stored processor-executable software instructions are configured to cause the processor of the wireless communication device to perform operations such that initializing the biased selection in response to attaching to the two mobile networks comprises:
setting a probability of selecting the first subscription to complete the paging communication equal to $T_2/(T_1+T_2)$; and
setting a probability of selecting the second subscription to complete the paging communication equal to $T_1/(T_1+T_2)$, wherein:
$T_1$ is a cycle length of a discontinuous reception period for the first subscription; and
$T_2$ is a cycle length of a discontinuous reception period for the second subscription.

49. The non-transitory processor-readable storage medium of claim 47, wherein the stored processor-executable software instructions are configured to cause the processor of the wireless communication device to perform operations such that initializing the biased selection in response to attaching to the two mobile networks comprises:
setting a probability of selecting the first subscription to complete the paging communication equal to $(x*T_2)/(T_1+(x*T_2))$; and
setting a probability of selecting the second subscription to complete the paging communication equal to $T_1/(T_1+(x*T_2))$, wherein:
$T_1$ is a cycle length of a discontinuous reception period for the first subscription;
$T_2$ is a cycle length of a discontinuous reception period for the second subscription; and
x is a paging blocking bias value.

50. The non-transitory processor-readable storage medium of claim 47, wherein the stored processor-executable software instructions are configured to cause the processor of the wireless communication device to perform operations further comprising reinitializing the biased selection when at least one of a discontinuous reception period for the first subscription, a discontinuous reception period for the second subscription, and a paging blocking bias is changed.

51. The non-transitory processor-readable storage medium of claim 47, wherein the biased selection is a biased coin algorithm.

52. A non-transitory processor-readable storage medium having stored thereon processor-executable software instructions configured to cause a processor of a dual-subscriber identity module (SIM)-dual-standby communication device to perform operations comprising:
initializing a Markov chain algorithm with a first state and a second state in response to the dual-SIM-dual-standby communication device attaching to two mobile networks;
using the Markov chain algorithm to select one of a first subscription and a second subscription in response to detecting a paging collision between the first subscription and the second subscription; and
completing a paging communication for one of the first subscription and the second subscription based on a result of the Markov chain algorithm.

53. The non-transitory processor-readable storage medium of claim 52, wherein the stored processor-executable software instructions are configured to cause the processor of the dual-SIM-dual-standby communication device to perform operations further comprising reinitializing the Markov chain algorithm when at least one of a discontinuous reception period for the first subscription, a discontinuous reception period for the second subscription, and a paging blocking bias is changed.

54. The non-transitory processor-readable storage medium of claim 52, wherein the stored processor-executable software instructions are configured to cause the processor of the dual-SIM-dual-standby communication device to perform operations such that initializing the Markov chain algorithm comprises:
- creating rules for transitioning between the first and second states;
- selecting an initial state, wherein the initial state is one of the first and second states; and
- determining values for $T_1$, $T_2$, and x, wherein,
  - $T_1$ is a cycle length of a discontinuous reception period for the first subscription;
  - $T_2$ is a cycle length of a discontinuous reception period for the second subscription; and
  - x is a paging blocking bias value.

55. The non-transitory processor-readable storage medium of claim 54, wherein the rules for transitioning between the first and second states comprise:
- transitioning from the first state to the second state with a probability of $P_1$;
- transitioning from the second state to the first state with a probability of $P_2$;
- transitioning from the first state to the first state with a probability of $(1-P_1)$; and
- transitioning from the second state to the second state with a probability of $(1-P_2)$.

56. The non-transitory processor-readable storage medium of claim 55, wherein $T_1$ is greater than or equal to $(x*T_2)$.

57. The non-transitory processor-readable storage medium of claim 56, wherein:
- $P_1$ is zero; and
- $P_2$ is $1-((x*T_2)/T_1)$.

58. The non-transitory processor-readable storage medium of claim 54, wherein $T_1$ is less than $(x*T_2)$.

59. The non-transitory processor-readable storage medium of claim 58, wherein:
- $P_1$ is $1-(T_1/(x*T_2))$; and
- $P_2$ is zero.

60. The non-transitory processor-readable storage medium of claim 52, wherein the stored processor-executable software instructions are configured to cause the processor of the dual-SIM-dual-standby communication device to perform operations such that using the Markov chain algorithm to select one of the first subscription and the second subscription comprises:
- transitioning to a new current state;
- selecting one of the first subscription and the second subscription based on the new current state; and
- storing the new current state in memory for use in resolving a subsequent paging collision.

61. The non-transitory processor-readable storage medium of claim 60, wherein the stored processor-executable software instructions are configured to cause the processor of the dual-SIM-dual-standby communication device to perform operations such that selecting one of the first subscription and the second subscription based on the new current state comprises:
- selecting the first subscription when the new current state is the second state; and
- selecting the second subscription when the new current state is the first state.

* * * * *